United States Patent
Roffers et al.

(10) Patent No.: US 10,589,383 B2
(45) Date of Patent: Mar. 17, 2020

(54) CUTTING POSITION ADJUSTMENT FOR CUTTING HEAD

(71) Applicant: Preco, Inc., Somerset, WI (US)

(72) Inventors: Steven J. Roffers, Hudson, WI (US); Daniel B. Miller, Roberts, WI (US)

(73) Assignee: PRECO, INC., Somerset, WI (US)

( * ) Notice: Subject to any disclaimer, the term of this patent is extended or adjusted under 35 U.S.C. 154(b) by 672 days.

(21) Appl. No.: 15/165,714

(22) Filed: May 26, 2016

(65) Prior Publication Data
US 2016/0346872 A1    Dec. 1, 2016

Related U.S. Application Data

(60) Provisional application No. 62/167,008, filed on May 27, 2015, provisional application No. 62/167,019, filed on May 27, 2015.

(51) Int. Cl.
*B23K 26/00* (2014.01)
*B23K 26/359* (2014.01)
(Continued)

(52) U.S. Cl.
CPC ........ *B23K 26/359* (2015.10); *B23K 26/0006* (2013.01); *B23K 26/082* (2015.10);
(Continued)

(58) Field of Classification Search
CPC .. B23K 26/00; B23K 26/259; B23K 26/0006; B23K 26/082; B23K 26/0846; B23K 26/0876; B23K 26/16
(Continued)

(56) References Cited

U.S. PATENT DOCUMENTS 5,172,326 A  *  12/1992  Campbell, Jr. ...... B23K 26/032
                                                    700/134
5,944,278 A  *   8/1999  Stevens, III  ........... A24C 5/007
                                                    242/523.1

(Continued)

FOREIGN PATENT DOCUMENTS

DE    102011054360 A1    4/2013
EP        1741525 A1    1/2007
(Continued)

OTHER PUBLICATIONS

Examiner's Report Issued in Corresponding European Patent Application No. EP16170804.5, dated Sep. 26, 2016.
(Continued)

*Primary Examiner* — Dana Ross
*Assistant Examiner* — Ayub A Maye
(74) *Attorney, Agent, or Firm* — Westman, Champlin & Koehler, P.A.; Z. Peter Sawicki; Amanda M. Prose

(57) ABSTRACT

A laser cutting machine includes at least one galvo having a galvo field of view in which the galvo can cut a material moving with a speed past the galvo. A display in the machine provides an image of at least one pattern to be cut from a material, the pattern comprising of a plurality of objects with each object having a position on the material and each object comprising at least one cut. An optimizer in the machine receives the position on the material of each object of the pattern and assigns a start locations for each cut of each object and a trigger distance for each object to maximize the speed at which the material moves past the galvo while ensuring that each object is cut by the galvo at the object's respective position on the material.

17 Claims, 12 Drawing Sheets

(51) Int. Cl.
    *B23K 26/38*     (2014.01)
    *B23K 26/082*     (2014.01)
    *B23K 26/40*     (2014.01)
    *B23K 26/08*     (2014.01)
    *B23K 101/16*     (2006.01)

(52) U.S. Cl.
    CPC .......... *B23K 26/0846* (2013.01); *B23K 26/38* (2013.01); *B23K 26/40* (2013.01); *B23K 2101/16* (2018.08); *B65H 2301/51536* (2013.01); *B65H 2404/26* (2013.01)

(58) Field of Classification Search
    USPC .............. 219/121.6, 121.69, 121.71, 121.72, 219/121.67
    See application file for complete search history.

(56) References Cited

U.S. PATENT DOCUMENTS

| | | | | |
|---|---|---|---|---|
| 6,538,230 | B2* | 3/2003 | Lawson | B23K 26/0846 219/121.67 |
| 2002/0007552 | A1 | 1/2002 | Singleton et al. | |
| 2006/0191426 | A1* | 8/2006 | Timmerman | B26D 5/32 101/24 |
| 2009/0212033 | A1* | 8/2009 | Beck | B23K 26/0846 219/121.72 |
| 2010/0181165 | A1 | 7/2010 | Finn | |
| 2011/0073576 | A1* | 3/2011 | Bucklew | B23K 26/0846 219/121.72 |
| 2013/0340584 | A1* | 12/2013 | Hoepner | B65H 20/34 83/23 |
| 2015/0360318 | A1 | 12/2015 | Aubry | |

FOREIGN PATENT DOCUMENTS

| | | |
|---|---|---|
| EP | 2907613 A2 | 8/2015 |
| KR | 101009454 B1 | 1/2011 |
| WO | 9951386 A1 | 10/1999 |
| WO | 03022507 A1 | 3/2003 |

OTHER PUBLICATIONS

Examiner's Report Issued in Corresponding European Patent Application No. EP16171274.0, dated Sep. 28, 2016.

* cited by examiner

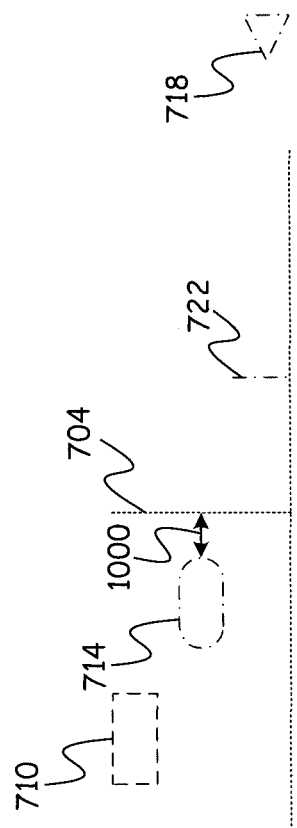
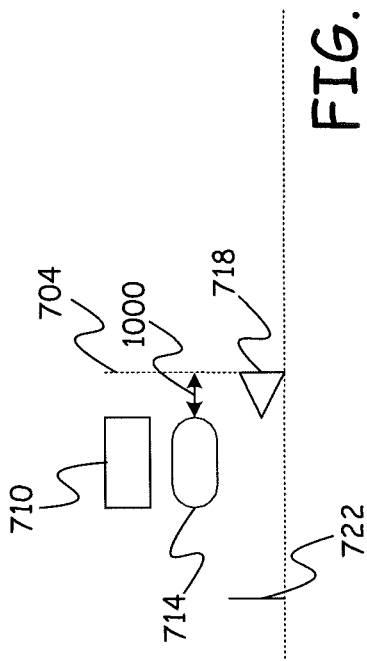

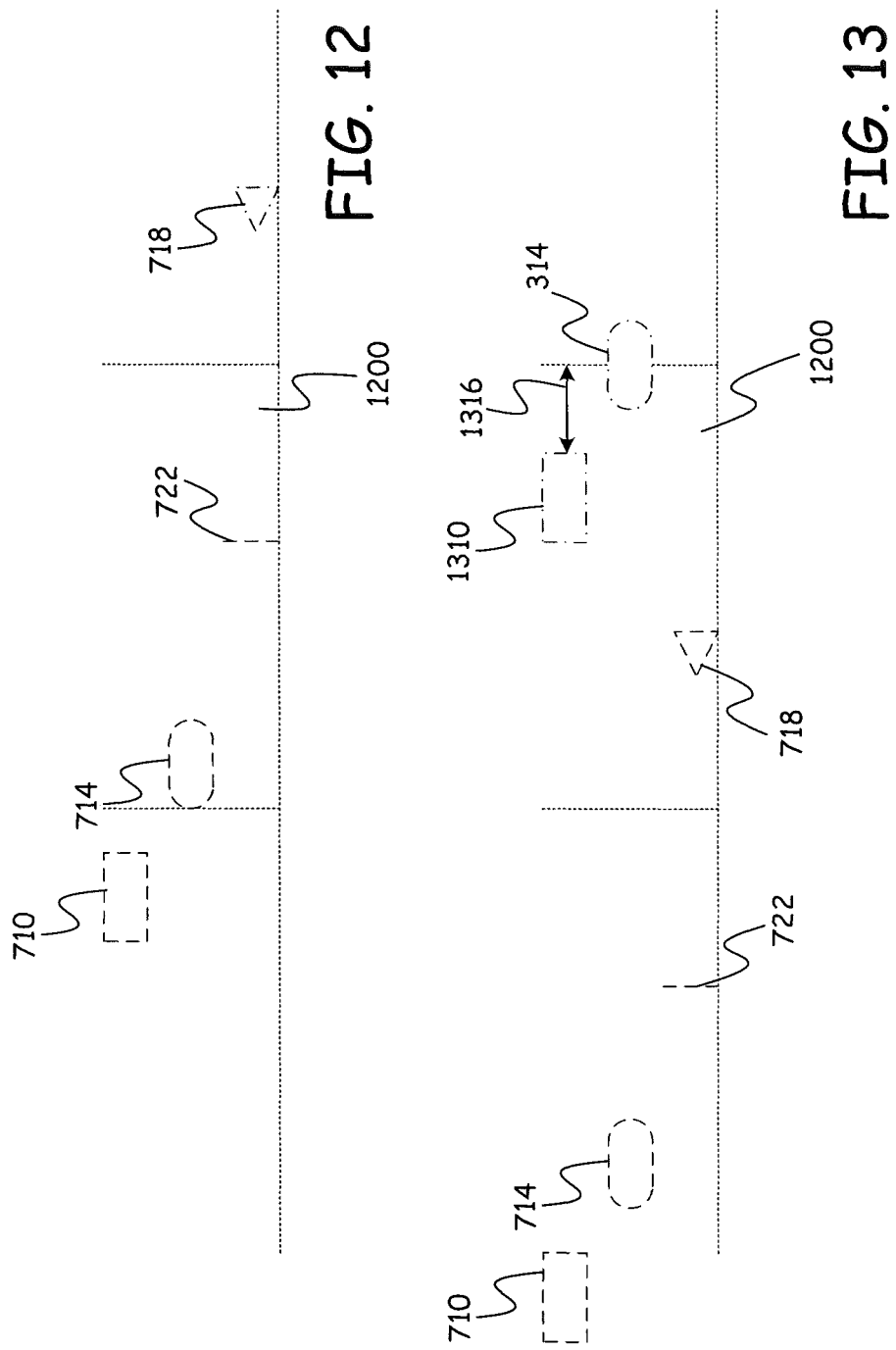

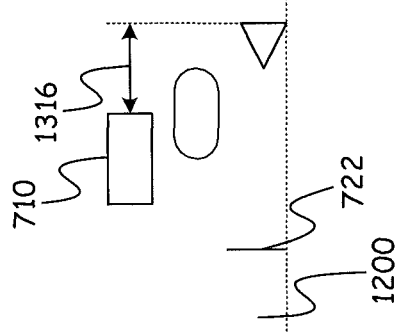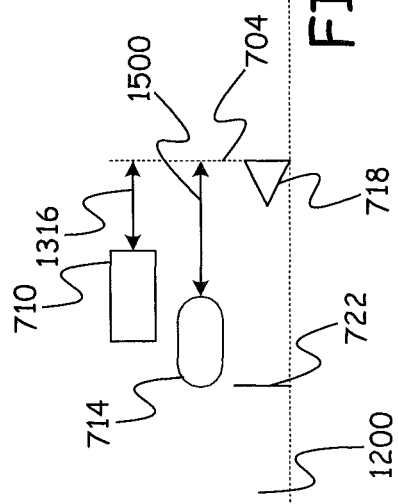

CUTTING POSITION ADJUSTMENT FOR CUTTING HEAD

CROSS-REFERENCE TO RELATED APPLICATION

The present application is based on and claims the benefit of U.S. provisional patent application Ser. No. 62/167,008, filed May 27, 2015 and U.S. Provisional Patent Application Ser. No. 62/167,019, filed May 27, 2015, the content of which is hereby incorporated by reference in its entirety.

BACKGROUND

Many laser cutting machines cut patterns into materials using a galvo head (often referred to as just a galvo) to set the position of the laser light on the material. A galvo includes two or more mirrors that can have their orientation adjusted based on a control signal so that laser light emitted by a laser is directed to different positions on the material. A galvo has a field of view representing the two-dimensional span of the laser light directed by the galvo. To cut locations outside of the galvo's field of view, the material must be moved relative to the galvo. This can be achieved by moving the galvo or by moving the material below the galvo head.

In some laser cutting systems, a web of material is moved past a stationery galvo. The galvo then receives control signals that cause the galvo to cut repeating pattern out of the web of material.

SUMMARY

A method includes receiving first cut path locations for a first object and second cut path locations for a second object to be cut from a material by a cutting head and offsetting the first cut path locations so that the offset first cut path locations are within a field of view for the cutting head. The second cut path locations are also offset so that the offset second cut path locations are within the field of view for the cutting head. A speed is selected for the material moving in a direction and the offset second cut path locations are shifted in the direction the material is moving based in part on the speed of the material.

An apparatus identifies cut path locations for a cutting machine. The apparatus includes a display providing a user interface for displaying a pattern of objects to be cut by the cutting machine from a web of material. A processor executes instructions to perform steps that include offsetting each object in the pattern to form start locations for each cut path of each object and iteratively attempting to increase a maximum speed for the web of material, such that for each attempted increase in the maximum speed of the web, the processor determines whether to alter the start locations of at least one object to ensure that the galvo has enough time to cut an object preceding the at least one object and retract to a galvo starting position of the at least one object before respective positions on the material where the cut paths of the at least one object are to be located have passed the respective start locations of the cut paths of the at least one object.

In a further embodiment, a laser cutting machine includes at least one galvo having a galvo field of view in which the galvo can cut a material moving with a speed past the galvo. A display in the machine provides an image of at least one pattern to be cut from a material, the pattern comprising a plurality of objects with each object having a position on the material and each object comprising at least one cut. An optimizer in the machine receives the position on the material of each object of the pattern and assigns a start location for each cut of each object and a trigger distance for each object to maximize the speed at which the material moves past the galvo while ensuring that each object is cut by the galvo at the object's respective position on the material.

BRIEF DESCRIPTION OF DRAWINGS

FIG. 10 shows the position on the material of two objects when cutting of the first object has completed.

FIG. 11 shows the offsets of the objects after the second object has been shifted during a first iteration.

FIG. 12 shows the position of the third object when the cutting of the second object has completed.

FIG. 13 shows the position of the first object when the cutting of the third object has completed.

FIG. 14 shows the offsets of the first, second and third objects after the first iteration is complete.

FIG. 15 shows the offsets of the first, second and third objects after all of the iterations are complete.

DETAILED DESCRIPTION

Embodiments described below provide a system for optimizing the positions where cuts in a pattern are made within a galvo field of view so as to maximize the speed of a web of material passing by the galvo. In accordance with some embodiments, multiple galvo heads are used to cut a single web of material and are optimized together.

Figure 1:
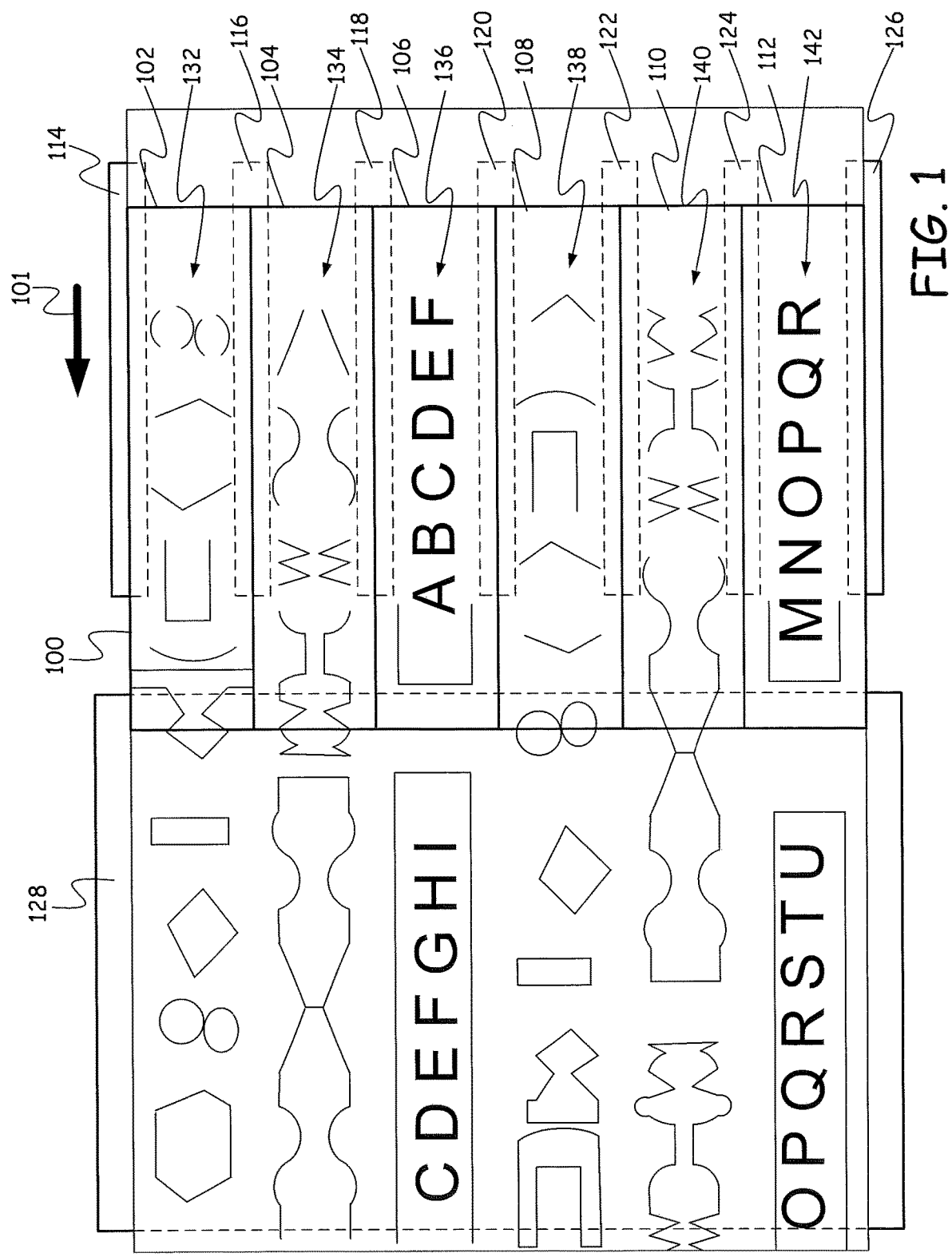
FIG. 1 is a top view of a web of material as it moves on conveyors below a galvo.

FIG. 1 provides a top view of a web of material 100 as it passes by six galvo fields of view 102, 104, 106, 108, 110 and 112 in downstream direction 101. Each galvo field of view is rectangular in FIG. 1 but other shapes for the galvo fields of view can be used. Web of material 100 is moved in direction 101 by isolated conveyors 114, 116, 118, 120, 122, 124 and 126 shown in phantom below web 100 where each isolated conveyor is separated from its neighboring conveyors by an open space. Web of material 100 is also moved by a downstream conveyor 128. Conveyors 114, 116, 118, 120, 122, 124, 126 and 128 include vacuum means that pull web of material 100 toward the conveyors (into the page in FIG. 1). As web of material 100 moves beneath the galvos, the galvos direct respective laser beams to cut web of material 100 and thereby form respective cut patterns. For example, the galvos of fields of view 102, 104, 106, 108, 110 and 112 form respective cut patterns 132, 134, 136, 138, 140 and 142.

Figure 2:
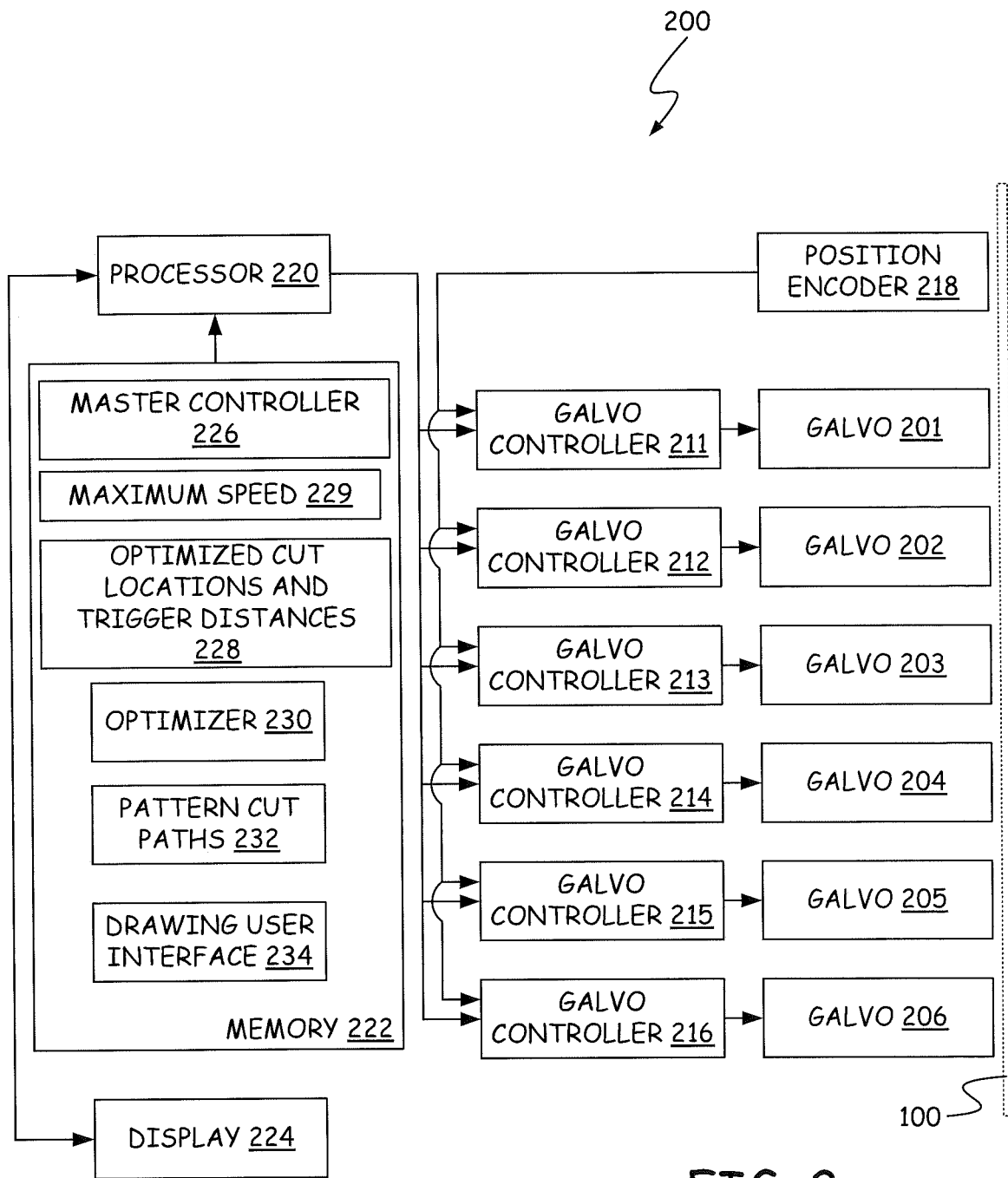
FIG. 2 is a block diagram of a laser cutting machine in accordance with some embodiments.

FIG. 2 provides a block diagram of a system 200 for cutting web of material 100 using a set of six parallel galvos 201, 202, 203, 204, 205 and 206. System 200 includes a processor 220, a memory 222 and a display 224. System 200 also includes galvo controllers 211, 212, 213, 214, 215 and 216 that respectively control galvos 201, 202, 203, 204, 205 and 206 based on commands from processor 220 and position information from a position encoder 218. The position information from position encoder 218 describes the distance that web of material 100 moves relative to the galvos. Galvo controllers 211, 212, 213, 214, 215 and 216 can each be implemented on a separate PCI card with each card including a separate digital signal processor.

Memory 222 holds Drawing User Interface instructions 234 that are executed by processor 220 and cause processor 220 to display a user interface on display 224. The user interface allows a user to indicate the shape and position of cuts that are to be made by each galvo. This cut information is stored as pattern cut paths 232 in memory 222.

Memory 222 also includes Optimizer instructions 230 that are executed by processor 220 and cause processor 220 to group the cut paths in pattern cut paths 232 into objects and identify optimum locations in each galvo's field of view where the first cut of each object is to be started. In addition, Optimizer instructions 230 cause processor 220 to identify a trigger distance for each object, where the trigger distance of an object is the distance that web of material 100 moves between when the first cut of a previous object is made and when the first cut of the current object is made. The output of Optimizer instructions 230 is optimized cut locations and trigger distances 228 and a maximum speed for the web 229.

Memory 222 also includes Master Controller instructions 226 that are executed by processor 220 and cause processor 220 to send instructions to galvo controllers 211, 212, 213, 214, 215 and 216 based on optimized cut locations and trigger distances 228 and the maximum speed 229. In particular, Master Controller instructions 226 indicate all of the galvo field of view locations where cuts are to begin, the trigger distances between objects, the order in which cuts are to be made, and the repeat distance that web of material 100 should move between repetitions of the pattern represented by the cut information.

Figure 3:
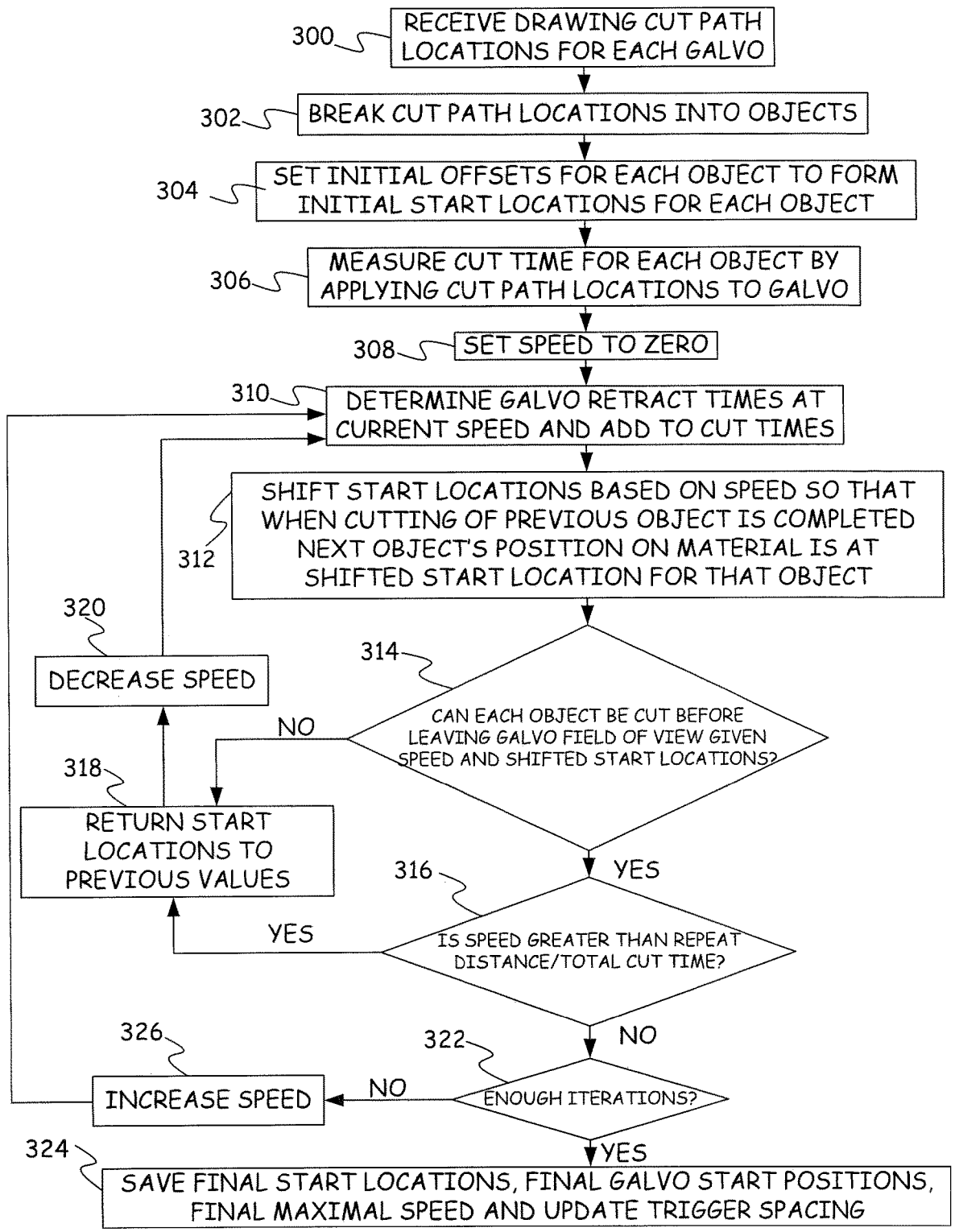
FIG. 3 is a flow diagram of a method of optimizing galvo cutting locations for a pattern.
Figure 4:
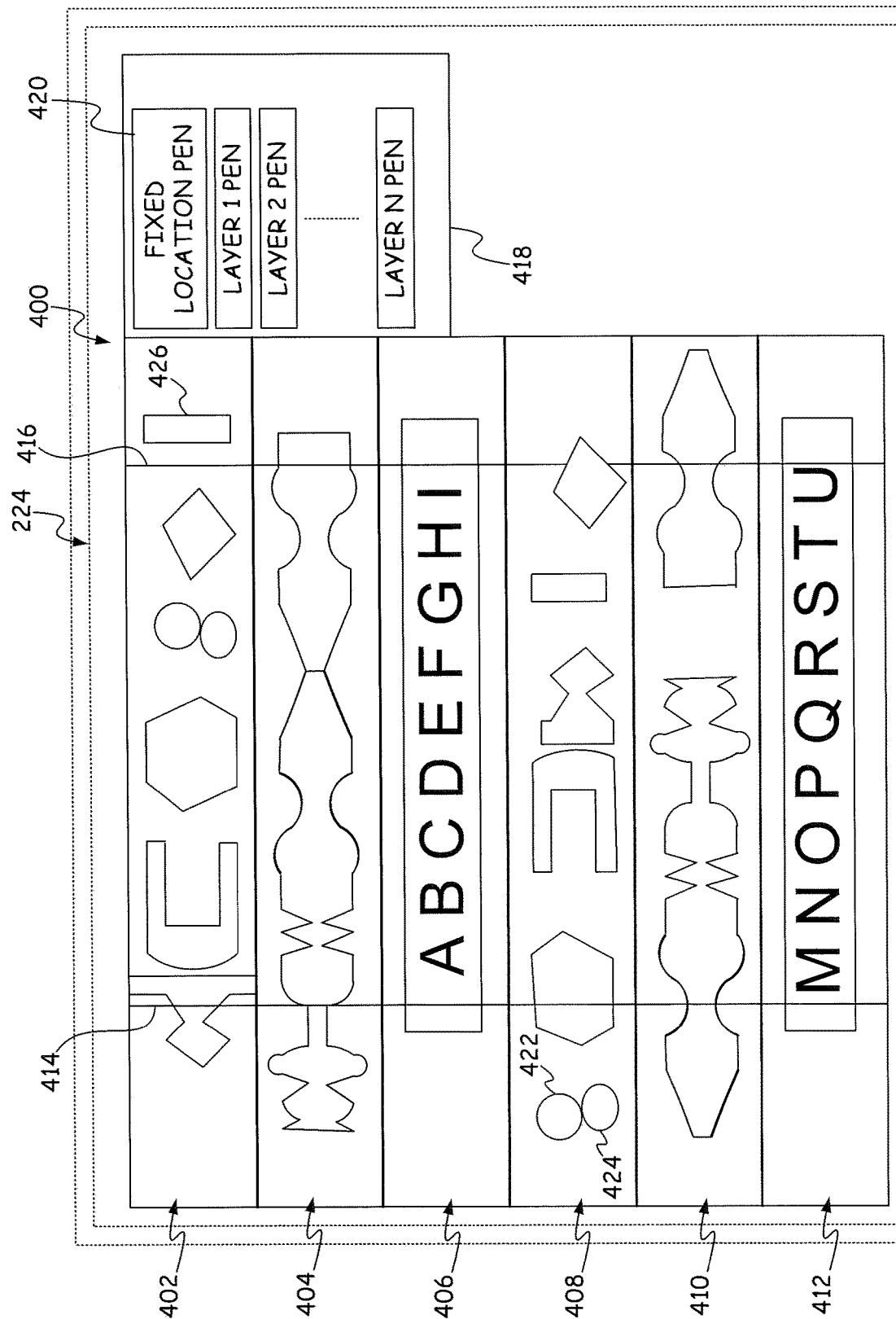
FIG. 4 is an example user interface in accordance with one embodiment.

FIG. 3 shows a method performed by system 200 in accordance with several embodiments. In step 300 of FIG. 3, processor 220 receives drawing cut path locations 232 for each galvo using Drawing User Interface instructions 234. FIG. 4 provides an example of a drawing user interface 400 shown on display 224. Drawing user interface 400 includes a separate row for each galvo including rows 402, 404, 406, 408, 410 and 412. Each row includes a downstream limit 414 and an upstream limit 416 for the galvo field of view. Within each row, a user is able to indicate a cut that is to be made by the respective galvo by selecting a pen from pen control box 418 and using a pointing device to draw the shape of the cut at a desired position. In accordance with some embodiments, different pens are provided for different layers such that all of the cuts within a single layer are considered to be part of a same object. In addition, a fixed location pen 420 is provided such that any cuts designated by the fixed location pen have their position fixed within the galvo field of view between downstream limit 414 and upstream limit 416. In order to form a valid pattern, all fixed location cuts designated by fixed location pen 420 must be within a galvo field of view. As shown in FIG. 4, cuts that are not fixed location cuts may be designated outside of the galvo field of view. For example, circle cuts 422 and 424 for the galvo assigned to row 408 are downstream from the galvo field of view while rectangular cut 426 of row 402 is upstream of the galvo field of view.

Figure 5:
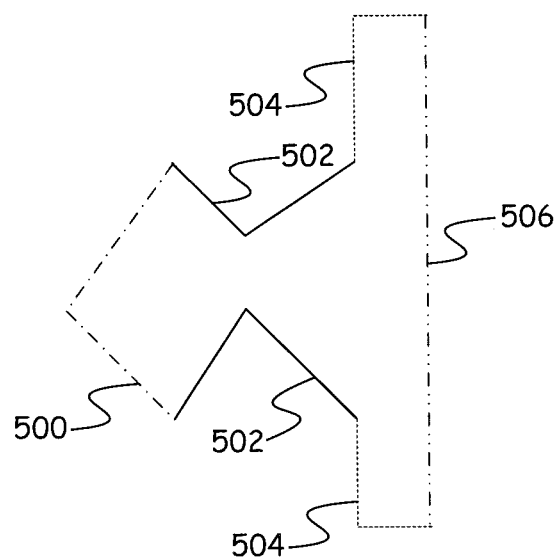
FIG. 5 is a portion of a pattern broken into objects.

At step 302, Optimizer instructions 230 break the pattern cut paths 232 into objects. In accordance with one embodiment, each object is formed by grouping cuts between breaks when the laser is turned off to move from one cut to a next cut. In other embodiments, the objects are formed based on the layers used to draw the cuts. FIG. 5 provides an expanded view of some of the cut paths shown in row 402 of FIG. 4 with the cut paths grouped into four objects: object 500 shown by dash-dot-dash lines, object 502 shown by solid lines, object 504 shown by dashed lines and object 506 shown as a dash-double dot-dash line. Note that object 502 consists of two cut paths that are not continuous with each other and object 504 consists of two cut paths that are not continuous with each other. Thus, the cut paths assigned to an object can be one continuous cut path or can be multiple discontinuous cut paths. In accordance with most embodiments, the cut paths are grouped into objects such that all the cut paths of one object are cut together. In other words, cutting of the cut paths of one object is not interrupted by the cutting of cut paths for other objects.

At step 304, initial offsets are set for each object to form an initial galvo start position for each object and an initial start location for each cut path assigned to the object. The galvo start position for an object represents the location in the galvo field of view where the galvo will start cutting the first cut path of the object. The start location for a cut path is the location in the galvo field of view where the cut path will be located when the galvo starts cutting the object. Thus, each cut path of an object has a drawn position which is the position where the cut path was drawn on the user interface relative to the center of the galvo field of view and a start location which is the position of the cut path in the galvo's field of view when the galvo starts cutting the object. Step 304 involves offsetting the drawn positions of each cut path of each object to form a galvo start position for each object and a start location for each cut path that makes up the object.

Figure 6:
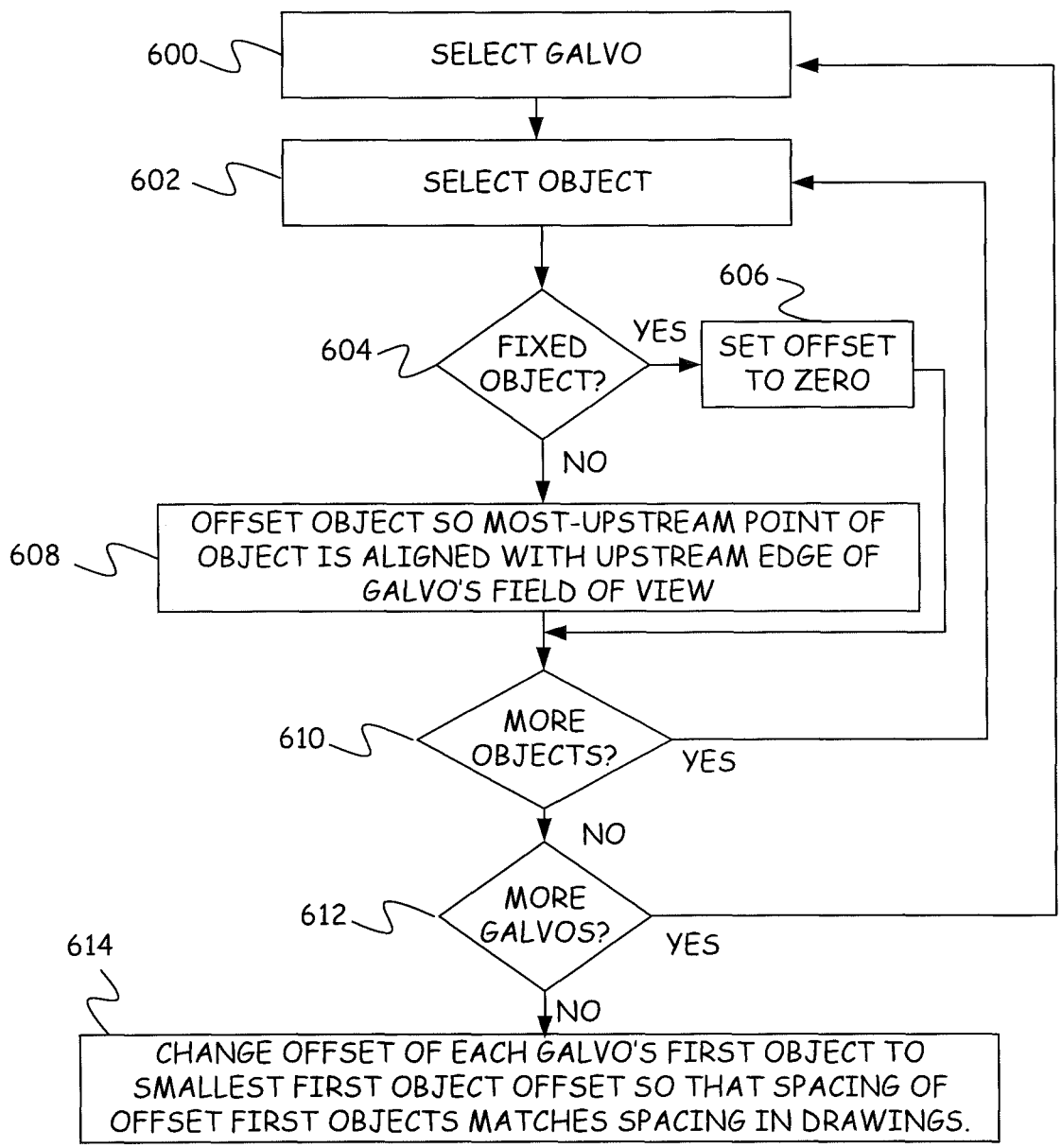
FIG. 6 is a method of performing an initial offset of objects.

FIG. 6 provides a flow diagram of step 304. In step 600 of FIG. 6, one of the galvos is selected. At step 602, an object to be cut by the galvo is selected. At step 604, the process determines if the object was designated as fixed by Drawing User Interface 234. If the object is fixed, it cannot be offset and the offset value is set to zero at step 606. If the object is not fixed, each cut path of the object is offset so that the most-upstream point of the object is aligned with the upstream edge of the galvo's field of view at step 608. After steps 606 and 608, the process determines if there are more objects assigned to the galvo. If there are more objects, the process returns to step 602 and the next object is selected. Steps 604, 606 and 608 are then repeated for the newly selected object. When all of the objects assigned to a galvo have been processed, the method determines if there are more galvos at step 612. If there are more galvos, the next galvo is selected at step 600 and steps 602 through 612 are repeated.

Figures 7, 8:
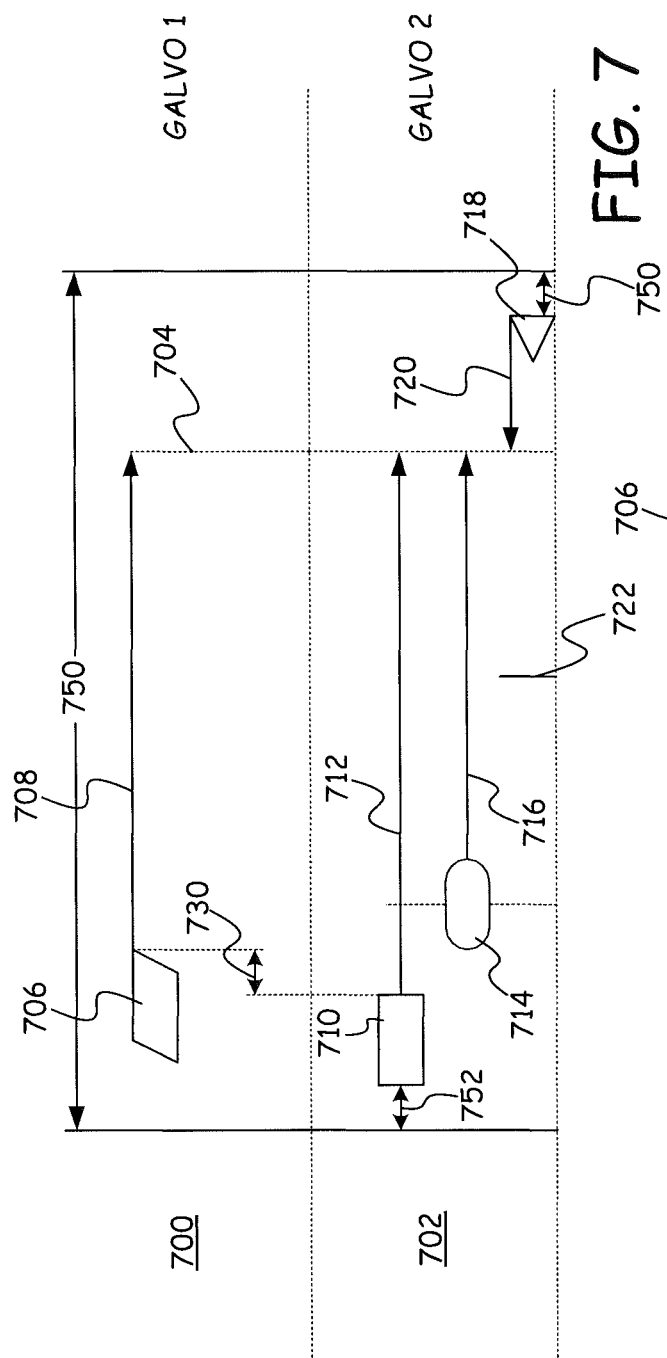
FIG. 7 provides a graphical representation of offset distances for two galvos.
FIG. 8 shows the initial offsets for the objects of galvo number two of FIG. 7.

FIG. 7 depicts the offsetting performed by steps 600-612 for two galvos 700 and 702. In FIG. 7, the upstream edge of galvos 700 and 702 is depicted by line 704. For galvo 700, the upper right corner of object 706 is aligned with upstream edge 704 by offsetting object 706 a distance 708. For galvo 702, object 710 is offset a distance 712 to upstream edge 704, object 714 is offset a distance 716 to upstream edge 704 and object 718 is offset a distance 720 to upstream edge 704. Object 722 is not offset because it has been designated as being fixed. In accordance with some embodiments, offset distances 708, 712 and 716 are considered to be positive offset distances while offset distance 720 is considered to be a negative offset distance. This is in conformance with an embodiment in which the cut positions are defined relative to the center of the galvo field of view with the center being located at position (0,0) and objects to the left of center being in the negative x direction and objects to the right of center being in the positive x direction.

After all of the non-fixed objects for all the galvos have been offset, step 614 of FIG. 6 is performed in which the offset of each galvo's first object to be cut is changed to the smallest first object offset so that the spacing of the offset first objects matches the spacing between the first objects in the drawings. For example, in FIG. 7, first object 706 is spaced from first object 710 by a distance 730. In step 614, the offset of object 710 is changed from offset distance 712 to offset distance 708 to maintain this spacing in the first offset objects.

The resulting offset positions of objects 706, 710, 714, 718 and 722 after step 614 are shown in FIG. 8. Objects 706, 714 and 718 are offset so their upstream-most portion is aligned with the upstream edge 704 of the galvo field of view. Object 710 is offset downstream from upstream edge 704 by distance 730, which matches the spacing between objects 706 and 710 before the objects were offset. Object 722 is not offset and remains the same distance from upstream edge 704 as in the drawn pattern.

Returning to FIG. 3, after the initial offsets have been set for each object at step 304, the cut time for each object is measured by applying the cut path locations of each object to the respective galvo controller. The galvo controller then moves the galvo in response to the cut path locations while keeping the laser off. The time it takes for the galvo controller to move the galvo through all of the cut path locations of the object is measured and stored for each object. Thus, in one embodiment, the cut times are not modeled, but instead are measured directly using the actual galvo that will be performing the cutting.

At step 308, the maximum speed of the web of material is set to zero. At step 310, a galvo retract time is determined for each object with the retract time being the time needed for the galvo to move the laser light from the last cut position of the current object to the first cut position of the next object. This retract time is added to the cut time of the current object to form a cut and retract time.

At step 312, the galvo start positions for each non-fixed object are shifted based on the web speed so that when cutting of a previous object is completed, the next object's position on the material is at the shifted galvo start position for the next object.

Figure 9:
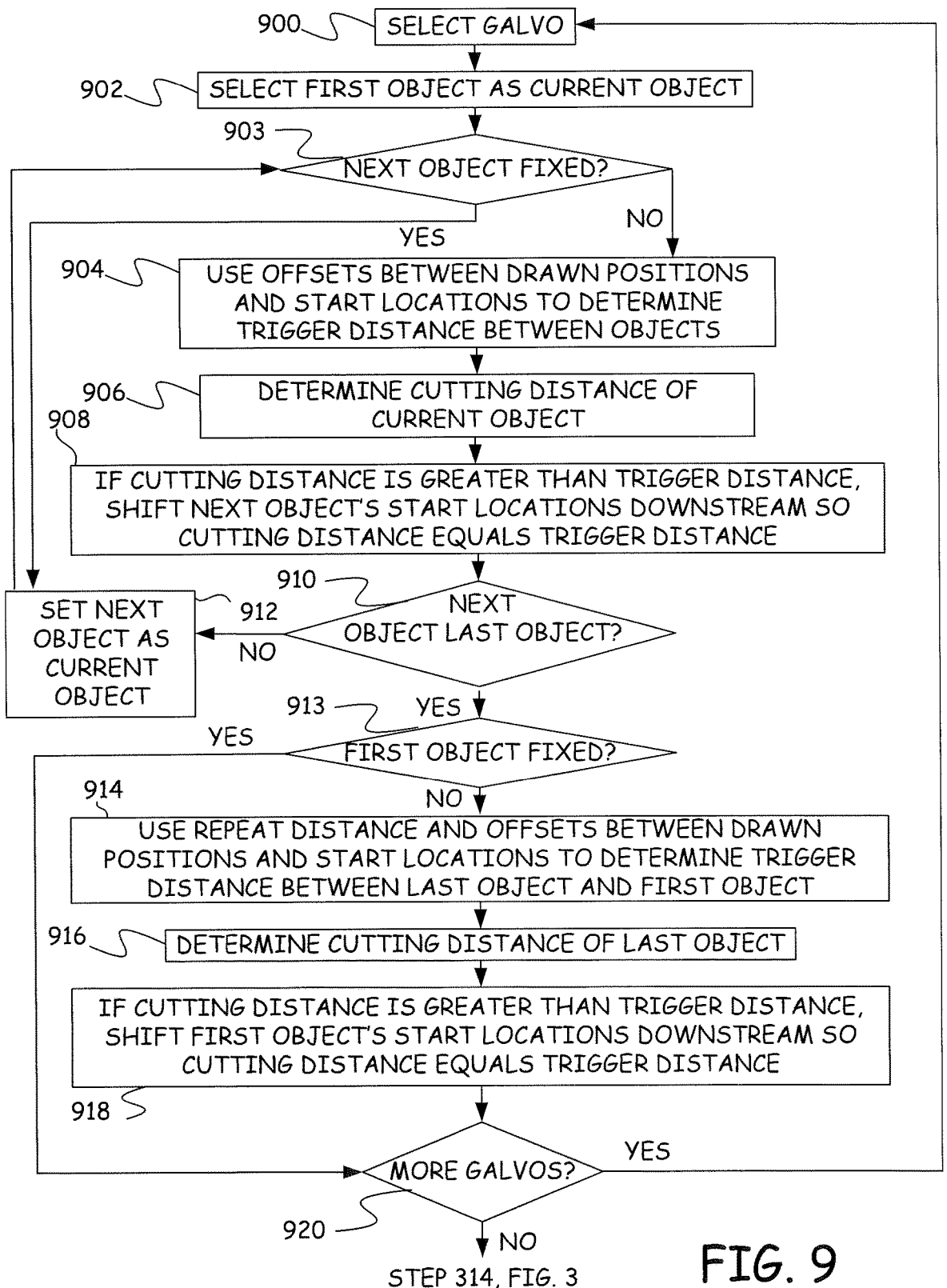
FIG. 9 provides a flow diagram for shifting the offsets of objects to provide a set of galvo start positions and trigger distances for each object.

FIG. 9 provides a flow diagram of a method of performing step 312. At step 900, a galvo is selected. At step 902, the first object to be cut by the selected galvo is set as a current object. At step 903 the next object to be cut after the current object is examined to determine if it is a fixed object. If the next object is a fixed object, the next object cannot be shifted. As a result, the process skips to step 912 where the next object is set as the current object and processing then returns to step 903.

If the next object is not a fixed object, the process continues at step 904 where offsets between the drawn positions and the galvo start positions are used to determine a trigger distance between the current object and the next object. The trigger distance is the distance that the material moves between the start of cutting of the current object and the start of cutting the next object. In accordance with one embodiment, the trigger distance is the difference between the offsets of the current and next objects.

At step 906, a cutting distance of the current object is determined by multiplying the cutting-plus-retract time for the current object by the current maximum speed of the web of material to obtain the distance the material will move during the cutting of the current object. At step 908, if the cutting distance is greater than the trigger distance, the next object's galvo start position and the start locations of each cut path of the object are shifted downstream in the direction the web of material is moving so that the cutting distance equals the trigger distance. In other words, the offset of the next object is reduced to thereby increase the trigger distance. The offset of the next object is decreased by an amount equal to the difference between the cutting distance and the trigger distance and thus is decreased in part based on the maximum speed of the web of material since the cutting distance is a function of the maximum speed of the web of material.

Step 908 is equivalent to setting the galvo start position and the start locations of the cut paths of the next object so that the spacing between the previous object that was cut and the next object matches the spacing in the drawing. Thus, step 908 involves aligning the next object's start locations with the location on the material where the drawing indicates the next object should be positioned. In addition, step 908 ensures that this alignment occurs at the earliest possible time by performing the alignment as soon as cutting of the previous object has completed and the galvo has retracted to the next object.

For example, in FIG. 10 the dotted lines show the position of object 710 on the web of material when the cutting of object 710 is complete and the galvo has retracted to cut object 714. The positions on the web of material where objects 714 and 718 must be placed are shown by the dash-dot-dash lines and are based on the positions of objects 710, 714 and 718 provided by Drawing User Interface instructions 234. As seen in FIG. 10, when the cutting of object 710 is complete and the galvo has retracted, the location for object 714 on the web of material is downstream from upstream edge 704 of the galvo field of view. In particular, the location for object 714 is a distance 1000 downstream from edge 704. In step 908, the start locations of the cut paths of object 714 are shifted from the position shown in FIG. 8 so that the start locations are aligned with the locations for the cut paths of object 714 shown in FIG. 10.

FIG. 11 shows the cut path start locations for objects 710, 714, 718, and 722 after the shift of step 908 has been performed. As shown in FIG. 11, object 714's start locations have has been shifted downstream by distance 1000 so that the start locations for object 714 are aligned with the locations of the cut paths for object 714 on the web of material when the cutting of and retraction from object 710 is complete.

At step 910, the method determines if the next object is the last object. If the next object is not the last object, the next object is set to the current object at step 912 and steps 903, 904, 906 and 908 are repeated for the new current object. FIG. 12 shows the performance of step 908 with object 722 as the current object. In FIG. 12, the position of cut objects 710, 714 and 722 are shown in dotted lines and the location for object 718 on the web of material is shown in dash-dot-dash lines. FIG. 12 shows the position of cut objects 710, 714 and 722 and the location for object 718 immediately after object 722 has been cut and the galvo has retracted to the starting cut position for object 718. As shown in FIG. 12, when object 722 has been cut and the galvo retracts to the galvo start position for object 718, the location for object 718 on the web of material has not yet entered galvo field of view 1200. As a result, the trigger distance between objects 722 and 718 is greater than the cutting distance and the galvo start position for object 718 does not need to be changed.

When the next object is the last object in the pattern at step 910, the process continues at step 913 where it determines if the first object is fixed. If the first object is fixed, it cannot be shifted and the process skips down to step 920 without altering the offset of the first object. If the first object is not fixed, step 914 is performed where the repeat distance and the offsets between the drawn positions and the start locations of the last object and the first object are used to determine the trigger distance between the last object and the first object. The repeat distance is the distance the material moves before the drawn pattern is repeated. In FIG. 7, the repeat distance is shown as 750. In one embodiment, the trigger distance is determined as the repeat distance minus the difference between the first object offset and the last object offset. At step 916, the cutting distance of the last object is determined by multiplying the cutting time of the last object by the maximum speed of the web of the material. At step 918, if the cutting distance is greater than the trigger distance, the first object's start locations are shifted downstream so that the cutting distance equals the trigger distance. Step 918 is equivalent to shifting the start locations for the first object so that the start locations coincide with the locations where the cut paths of the first object are positioned on the web of material when the galvo has finished cutting the last object and has retracted to the first object's galvo start position.

The locations of the elements used in step 918 are shown in FIG. 13 where the positions of cut first object 710, cut second object 714, cut third object 722 and cut fourth object 718 are shown in dotted lines and the locations where the next occurrences of objects 710 and 714 are to be positioned on the web are shown as dash-dot-dash lines 1310 and 1314, respectively. Thus, at step 918, the start locations for the cut paths of first object 710 are shifted to match positions 1310 shown in FIG. 13 resulting in the start locations shown in FIG. 14. In particular, the upstream portion of object 710 in FIG. 14 is separated from upstream edge 704 of galvo field of view 1200 by a distance 1316 that corresponds to distance 1316 between position 1310 on the web of material for object 710 and upstream edge 704.

At step 920, the process of FIG. 9 determines if there are more galvos. If there are more galvos, the next galvo is selected by returning to step 900 and steps 902-918 are repeated. When all the galvos have been processed at step 920, the method returns to step 314 of FIG. 3.

At step 314, the method determines if each object can be cut before leaving the galvo field of view given the maximum speed of the web of material and the start locations of the cut paths. In other words, the system determines if the cutting distance for the object is greater than the distance between the downstream edge of the galvo field of view and the downstream edge of the object. If all of the objects for all of the galvos can be cut before leaving their respective field of views, the process continues at step 316 where it deter mines if the maximum speed of the web of material is greater than the repeat distance divided by a total cut time for each galvo. The total cut time for a galvo is the sum of the cut times plus retract times for all of the objects to be cut by the galvo. The determination in step 316 involves making a separate determination for each galvo. If the maximum speed is greater than the repeat distance divided by the total cut time for any of the galvos or if any of the objects cannot be cut before leaving their respective galvo's field of view at step 314, the process continues at step 318 where the start locations of the cut paths and the galvo start positions are returned to their previous values. The method then decreases the maximum speed of the web of material at step 320 and returns to step 310 to perform steps 310, 312, 314 and 316 for the new maximum speed. In accordance with one embodiment, the decrease in the maximum speed in step 320 is equal to one-half of the last increase in the maximum speed. Note that if the maximum speed is at zero, instead of decreasing the maximum speed at step 320, an error is shown indicating that the pattern cannot be cut.

If all of the objects can be cut at step 314 and if the maximum speed is not greater than the repeat distance divided by the total cut time for any of the galvos, the method determines if enough iterations have been performed at step 322. This can be determined by comparing the number of iterations to a fixed number of iterations and/or by determining whether any of the objects have been shifted during the last iteration. If no objects were shifted during the last iteration or enough iterations have been performed, the final start locations, final galvo start positions and the final maximum speed of the web are saved and the trigger spacing is updated at step 324. If more iterations need to be performed, the process continues at step 326 where the maximum speed of the web is increased. The process then returns to step 310 and steps 310, 312, 314 and 316 are performed at the increased maximum speed. The increase in the web speed can be a fixed amount or can be an amount that decreases by half with each increase in the maximum speed.

FIG. 15 shows the results of two iterations of the objects of FIG. 8 showing their final start locations. These are the locations of the cut paths when the galvo will begin cutting each of objects 710, 714, 718 and 722 as the web of material moves through the galvo field. The galvo begins cutting each object based on the trigger distance such that object 710 is initially cut by the galvo and when the web of material has moved the trigger distance for object 714, object 714 is cut and after the web material has moved the trigger distance for object 722, object 722 is cut and after the web of material has moved the trigger distance of object 718, object 718 is cut.

Note in FIG. 15, that object 710's start locations place its upstream edge a distance 1316 from the upstream edge 704 and object 714's start locations place its upstream edge a distance 1500 from upstream edge 704 while the start locations for object 718 place its upstream edge at upstream edge 704. By shifting object 714 a distance 1500, the galvo is given more time to cut object 710 before starting to cut object 714. Similarly, by shifting object 710 a distance 1316, the galvo is given more time to cut object 718 before starting to cut object 710. As shown in FIG. 7, the distance between object 718 and object 710, which is equal to the sum of distances 750 and 752 is less than the distance between object 722 and object 714. By shifting object 710 and 714, the embodiments described above take advantage of the larger distance between object 714 and object 718 to delay the writing of object 714 so as to give more time to write objects 718 and 710. This shifting allows the web of material to move at a faster speed than if all of the objects are written as soon as they appear completely in galvo field of view 1200.

Figure 16:
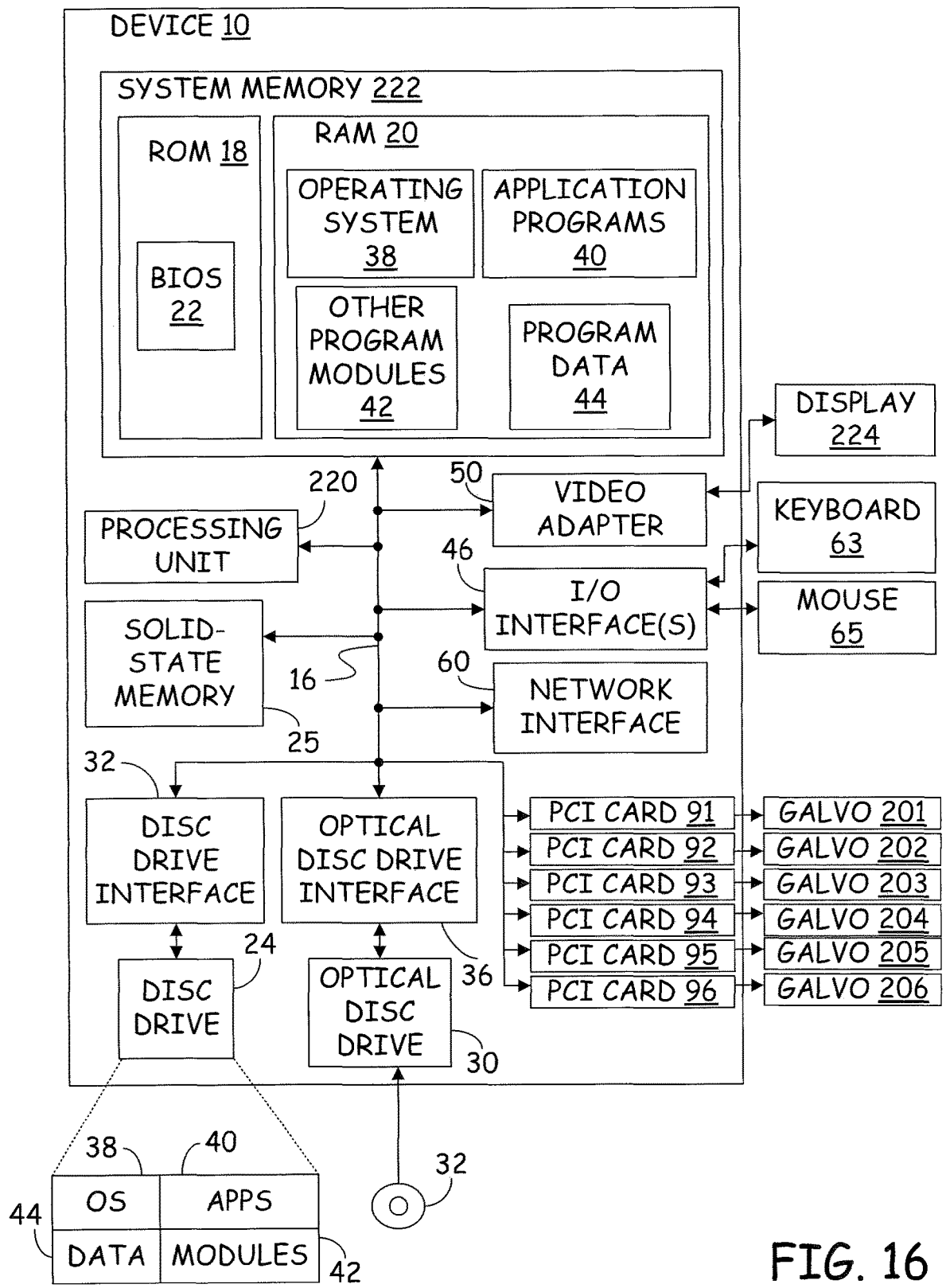
FIG. 16 provides a block diagram of a computing device.

An example of a computing device 10 that can be used to implement processor 220, memory 222 and galvo controllers 211, 212, 213, 214, 215, and 216 in the various embodiments is shown in the block diagram of FIG. 16. For example, computing device 10 may be used to perform any of the steps described above. Computing device 10 of FIG. 16 includes processing unit (processor) 220, system memory 222 and a system bus 16 that couples system memory 222 to processing unit 220. System memory 222 includes read only memory (ROM) 18 and random access memory (RAM) 20. A basic input/output system 22 (BIOS), containing the basic routines that help to transfer information between elements within the computing device 10, is stored in ROM 18.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, a solid state memory 25, and an optical disc drive 30. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives, solid state memory and external memory devices and their associated computer-readable media provide nonvolatile storage media for computing device 10 on which computer-executable instructions and computer-readable data structures may be stored. Other types of media that are readable by a computer may also be used in the exemplary operation environment.

A number of program modules may be stored in the drives, solid state memory 25 and RAM 20, including an operating system 38, one or more application programs 40, other program modules 42 and program data 44. For example, application programs 40 can include instructions for performing any of the steps described above including master controller 226, optimizer 230 and drawing user interface 234. Program data can include any data used in the steps described above including pattern cut paths 232, optimized cut locations and trigger distances 228 and maximum speed 229.

Input devices including a keyboard 63 and a mouse 65 are connected to system bus 16 through an Input/Output interface 46 that is coupled to system bus 16. Display 224 is connected to the system bus 16 through a video adapter 50 and provides graphical images to users. Other peripheral output devices (e.g., speakers or printers) could also be included but have not been illustrated. In accordance with some embodiments, display 224 comprises a touch screen that both displays input and provides locations on the screen where the user is contacting the screen.

Computing device 10 may operate in a network environment utilizing connections to one or more remote computers. The remote computer may be a server, a router, a peer device, or other common network node. The remote computer may include many or all of the features and elements described in relation to computing device 10. The network connections to device 10 can include a local area network (LAN) and a wide area network (WAN), for example. Such network environments are commonplace in the art. Computing device 10 is connected to the LAN through a network interface 60. Computing device 10 is also connected to the WAN 58 through a modem, which may be internal or external.

In a networked environment, program modules depicted relative to computing device 10, or portions thereof, may be stored in the remote memory storage device of a remote computer. For example, application programs may be stored utilizing such remote memory storage devices. In addition, data associated with an application program may illustratively be stored within remote memory storage devices. It will be appreciated that the network connections shown in FIG. 16 are exemplary and other means for establishing a communications link between the computers, such as a wireless interface communications link, may be used.

Device 10 includes six PCI Cards 91, 92, 93, 94, 95 and 96, which are connected to respective galvos 201, 202, 203, 204, 205, and 206. Although six PCI cards are shown, any number of PCI cards may be present in device 10. Each PCI card includes a digital signal processor that executes instructions to perform tasks assigned to the galvo controllers 211, 212, 213, 214, 215, and 216.

Although the discussion above refers to galvo heads, the embodiments can be utilized with any form of cutting head.

Although elements have been shown or described as separate embodiments above, portions of each embodiment may be combined with all or part of other embodiments described above.

Although the present invention has been described with reference to preferred embodiments, workers skilled in the art will recognize that changes may be made in form and detail without departing from the spirit and scope of the invention.

What is claimed is:

1. A method of cutting objects on a web of material with a laser cutting system comprising a first galvo and a processor, the method comprising:

receiving first cut path locations for an area of a first object and second cut path locations for an area of a second object to be cut from the material by the laser cutting system;

offsetting the first cut path locations so that the offset first cut path locations are within a field of view of the first galvo;

offsetting the second cut path locations so that the offset second cut path locations are within the field of view of the first galvo;

selecting a speed for the material moving in a direction;

shifting the offset second cut path locations in the direction the material is moving based in part on the speed of the material, receiving last cut path locations for a last object;

offsetting the last cut path locations so that the offset last cut path locations are within the field of view for the laser cutting system; and after shifting the offset first cut path locations, testing whether the first object is cut by the first galvo within the field of view of the first galvo when the material is moving at the speed;

determining a total cut and retract time for cutting all the objects and retracting between the objects;

determining a total cut distance and retract distance by multiplying the speed by the total cut time and retract time; and determining if the total cut distance and retract distance is greater than a repeat distance for a pattern.

2. The method of claim 1, wherein shifting the offset second cut path locations comprises shifting the offset second path locations so that a distance the material moves while the laser cutting system cuts the first object and retracts to a galvo start position for the second object is equal to the distance that the material will move between when the laser cutting system starts cutting the first object and when the laser cutting system is triggered to start cutting the second object.

3. The method of claim 1, further comprising:
increasing the speed for the material to form a new speed; and
shifting the shifted offset second cut path locations in the direction the material is moving based in part on the new speed.

4. The method of claim 1, further comprising:
receiving third cut path locations for a third object and fourth cut path locations for a fourth object to be cut from the material by a second galvo;
offsetting the third cut path locations so that the offset third cut path locations are within a field of view for the second galvo;
offsetting the fourth cut path locations so that the offset fourth cut path locations are within the field of view for the second galvo; and
shifting the offset fourth cut path locations in the direction the material is moving based in part on the speed of the material and the offset third cut path locations.

5. The method of claim 1, further comprising receiving a fixed cut path location that is designated as not being movable and not offsetting the fixed cut path location.

6. The method of claim 2, wherein shifting the offset second cut path locations increases the distance that the material will move between when the first galvo starts cutting the first object and when the first galvo is triggered to start cutting the second object.

7. An apparatus for identifying cut path locations for a laser cutting machine, the apparatus comprising:
a display providing a user interface for displaying a pattern of a plurality of objects to be cut by the laser cutting machine from a web of material; and
a processor executing instructions to perform steps, the steps comprising:
offsetting each object in the pattern to form start locations for each cut path of each object wherein all of the start locations of each object are in a field of view of a galvo of the laser cutting machine;
determining a final maximum speed for the web of material by determining a maximum speed for each object, each object's maximum speed being determined by iteratively attempting to increase an iterative maximum speed for each object, such that for each attempted increase in the iterative maximum speed, the processor determines whether to alter the start location of a cut of an initial object to ensure that the galvo has enough time to cut a preceding object that precedes the initial object and enough time to retract to the start location of the initial object, such iteration and determination being repeated for each subsequent object to be cut to determine maximum speed and start location for each subsequent object, the iterations being used to determine the final maximum speed for the web of material and final start locations for the cut paths for each object; and storing in memory the final maximum speed and the final start locations for each object.

8. The apparatus of claim 7, wherein iteratively attempting to increase the maximum speed for the web of material further comprises: for each attempted increase in the maximum speed, the processor determining whether the galvo can cut each object before the respective object leaves the galvo field of view given the start locations of each object and the attempted increase in the maximum speed.

9. The apparatus of claim 7, wherein iteratively attempting to increase the maximum speed for the web of material further comprises: for each attempted increase in the maximum speed, the processor determining whether a distance the web of material moves over a course of a sum of the cut times and retract times of all of the objects is greater than a repeat distance for repeating the pattern on the web of material.

10. The apparatus of claim 7, wherein;
the user interface displays a separate pattern of the objects for each of a plurality of galvos, where each pattern of the objects is to be cut by the laser cutting machine from the web of material; and the processor executes instructions to perform further steps comprising:
offsetting each object in each pattern to form start locations for each object wherein for each pattern all of the start locations of each object in the pattern are in a field of view of a respective galvo assigned the pattern;
wherein iteratively attempting to increase the maximum speed for the web of material further comprises:
for each galvo, for each attempted increase in the maximum speed of the web, the processor determines whether to alter the start locations of the initial object assigned to the galvo to ensure that the galvo has enough time to cut the preceding object of the initial object and retract to a galvo starting position of the at the initial object before respective positions on the material where the cut paths of the at the initial object are to be located has passed the respective start locations of the cut paths of the at the initial object.

11. The apparatus of claim 7, wherein the user interface displays the pattern comprising at least one fixed object positioned in the galvo's field of view and wherein when iteratively attempting to increase the maximum speed for the web of material, the processor is prevented from moving the start locations of the initial object.

12. The apparatus of claim 10, wherein iteratively attempting to increase the maximum speed for the web of material further comprises:
for each attempted increase in the maximum speed, for each galvo, the processor determining whether the galvo can cut each object assigned to the galvo before the respective object leaves the galvo's field of view given the start locations of each object and the attempted increase in the maximum speed.

13. The apparatus of claim 10, wherein iteratively attempting to increase the maximum speed for the web of material further comprises:
for each attempted increase in the maximum speed, for each galvo, the processor determining whether a distance the web of material moves over the course of the sum of the cut times and retract times of all of the objects assigned to the galvo is greater than a repeat distance for repeating the pattern assigned to the galvo on the web of material.

14. A laser cutting machine comprising:
at least one galvo having a galvo field of view in which the galvo can cut a material moving with a speed past the galvo;

a display providing an image of at least one pattern to be cut from a material, the pattern comprising of a plurality of objects with each object having a position on the material and each object comprising at least one cut; and an optimizer, receiving the position on the material of each object of the pattern and assigning a start locations for each cut of each object and a trigger distance for each object, each start location representing a location of a cut path in the galvo field of view when cutting of the each object is to begin and the trigger distance of a current object representing a distance the material moves between when cutting begins for a preceding object and cutting begins for the current object, wherein the optimizer assigns the start locations and the trigger distances to maximize the speed at which the material moves past the galvo while ensuring that each object is cut by the galvo at each object's respective position on the material at a maximum speed by determining a total cut time and retract time for cutting all of the objects and retracting between the objects; determining a total cut distance and retract distance by multiplying the speed by the total cut time and retract time; and determining if the total cut distance and retract distance is greater than a repeat distance for a pattern.

15. The laser cutting machine of claim 14, further comprising a plurality of galvos wherein the display provides the image of a separate pattern of the plurality of objects for each of the plurality of galvos and wherein the optimizer assigns start locations and trigger distances to maximize the speed at which the material moves past the galvos while ensuring that each object of each pattern is cut by a respective galvo at the object's respective position on the material.

16. The laser cutting machine of claim 14, wherein at least one of the objects is designated as being fixed such that the optimizer cannot change the galvo start position of at least one of the object.

17. The laser cutting machine of claim 14, wherein the optimizer performs iterations with each iteration having a different speed for the material such that with each iteration a new retract time is calculated for each object.

* * * * *